United States Patent

Spence et al.

(10) Patent No.: US 9,227,558 B2
(45) Date of Patent: Jan. 5, 2016

(54) VEHICLE EXTERIOR DOOR HANDLE LIGHTING

(71) Applicants: Graham J. Spence, Troy, MI (US); Carolyn J. Thor, Lake Orion, MI (US); Panayiotis J. Karras, Ferndale, MI (US); So Yon Park, Sterling Heights, MI (US)

(72) Inventors: Graham J. Spence, Troy, MI (US); Carolyn J. Thor, Lake Orion, MI (US); Panayiotis J. Karras, Ferndale, MI (US); So Yon Park, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 369 days.

(21) Appl. No.: 13/740,922

(22) Filed: Jan. 14, 2013

(65) Prior Publication Data

US 2014/0197730 A1 Jul. 17, 2014

(51) Int. Cl.
| | |
|---|---|
| *B60Q 1/26* | (2006.01) |
| *B60Q 7/00* | (2006.01) |
| *E05B 81/76* | (2014.01) |
| *E05B 81/78* | (2014.01) |
| *E05B 85/10* | (2014.01) |
| *E05B 17/10* | (2006.01) |
| *G07C 9/00* | (2006.01) |

(52) U.S. Cl.
CPC .............. *B60Q 1/2669* (2013.01); *E05B 17/10* (2013.01); *E05B 81/76* (2013.01); *E05B 81/78* (2013.01); *E05B 85/10* (2013.01); *G07C 9/00007* (2013.01)

(58) Field of Classification Search
CPC ................. B60Q 1/2669; E05B 17/10; E05B 81/76–81/78
USPC ................. 315/80, 84; 362/501; 340/426.28; 307/10.8
See application file for complete search history.

(56) References Cited

U.S. PATENT DOCUMENTS

| | | | | |
|---|---|---|---|---|
| 6,848,818 | B2* | 2/2005 | Huizenga | 362/501 |
| 6,949,882 | B2* | 9/2005 | Suyama et al. | 315/77 |
| 7,049,940 | B2* | 5/2006 | Ieda et al. | 340/425.5 |
| 7,333,021 | B2* | 2/2008 | Ieda et al. | 340/641 |
| 7,751,664 | B2* | 7/2010 | Ieda et al. | 385/49 |
| 7,819,442 | B2* | 10/2010 | Ieda et al. | 292/336.3 |
| 8,157,402 | B2* | 4/2012 | Huss et al. | 362/106 |
| 8,333,492 | B2* | 12/2012 | Dingman et al. | 362/501 |
| 8,579,481 | B2* | 11/2013 | Minter et al. | 362/501 |
| 8,801,245 | B2* | 8/2014 | De Wind et al. | 362/511 |

* cited by examiner

*Primary Examiner* — Kenneth B Wells
(74) *Attorney, Agent, or Firm* — Quinn Law Group, PLLC

(57) ABSTRACT

A vehicle includes a body that defines an opening and a door configured to selectively open and close the opening. The vehicle also includes a lock that operatively connects the door to the body and can be either unlatched or latched for maintaining closure of the opening. The vehicle also includes a control device positioned on the door for unlatching the lock, and also a vehicle electric system and a lighting system. The lighting system includes a light-emitting element arranged on the control device and in electric communication with the electric system. The lighting system also includes a portable transmitter configured to transmit a signal and thereby commence an unlatching sequence for the lock. The lighting system additionally includes a controller configured to receive the signal and activate the light-emitting element in response to the received signal to display a visual lighting sequence signifying the status of the lock.

18 Claims, 2 Drawing Sheets

VEHICLE EXTERIOR DOOR HANDLE LIGHTING

TECHNICAL FIELD

The present disclosure relates to a lighting system integrated into an exterior door handle of a vehicle.

BACKGROUND

Vehicles are frequently equipped with exterior lighting systems for the purpose of illuminating the road ahead during periods of low visibility, such as darkness or precipitation.

Generally, vehicle exterior lighting is also intended to permit the subject vehicle to be seen from surrounding areas, for example by operators of other, approaching vehicles. Vehicle exterior lighting may also be used to assist vehicle occupants with identifying their vehicle, for example on approach to the vehicle in a crowded parking lot.

SUMMARY

A vehicle includes a body that defines an opening and a door configured to selectively open and close the opening. The vehicle also includes a lock that operatively connects the door to the body and can be either unlatched or latched for maintaining closure of the opening. Additionally, the vehicle includes a control device positioned on the door for unlatching the lock, and also a vehicle electric system and a lighting system. The lighting system includes a light-emitting element arranged on the control device and in electric communication with the electric system. The lighting system also includes a portable transmitter configured to transmit a signal and thereby commence an unlatching sequence for the lock. The lighting system additionally includes a controller configured to receive the signal and activate the light-emitting element in response to the received signal to display a visual lighting sequence signifying the status of the lock.

The control device may include a touch sensitive region or zone configured to unlatch the lock when the region is physically contacted by an operator having possession of the transmitter. The physical contact of the region may trigger authentication of completion of the unlatching sequence via the controller. Furthermore, the controller may deactivate the light-emitting element after the unlatching sequence is completed. The controller may deactivate the light-emitting element by progressively diminishing an intensity of the light emitted by the element.

The control device may be a door handle operatively connected to the lock. Additionally, the touch sensitive region may be identified with a visual image.

The controller may be programmed with a plurality of selectable visual lighting sequences for being displayed on the light-emitting element in response to the received signal to signify the status of the lock.

The visual lighting sequence may include an appearance of a dot of light traversing the light-emitting element.

The vehicle may additionally include a sensor configured to detect proximity of the transmitter to the vehicle and communicate the detected proximity to the controller. Furthermore, the controller may be configured to commence the lock unlatching sequence in response to the proximity being within a predetermined distance.

The controller may be configured to maintain the light-emitting element in active state during the lock unlatching sequence.

The portable transmitter may be configured to transmit the signal automatically.

A method of controlling lighting for a vehicle door employed to selectively open and close an opening in the vehicle body is also disclosed. The method includes transmitting a signal via a portable transmitter to thereby commence an unlatching sequence for a lock, receiving the signal via the controller, activating the light-emitting element in response to the received signal, and displaying the visual lighting sequence signifying the status of the lock on the light-emitting element.

The above features and advantages, and other features and advantages of the present disclosure, will be readily apparent from the following detailed description of the many aspects of the present disclosure when taken in connection with the accompanying drawings and appended claims.

DETAILED DESCRIPTION

Figure 1:
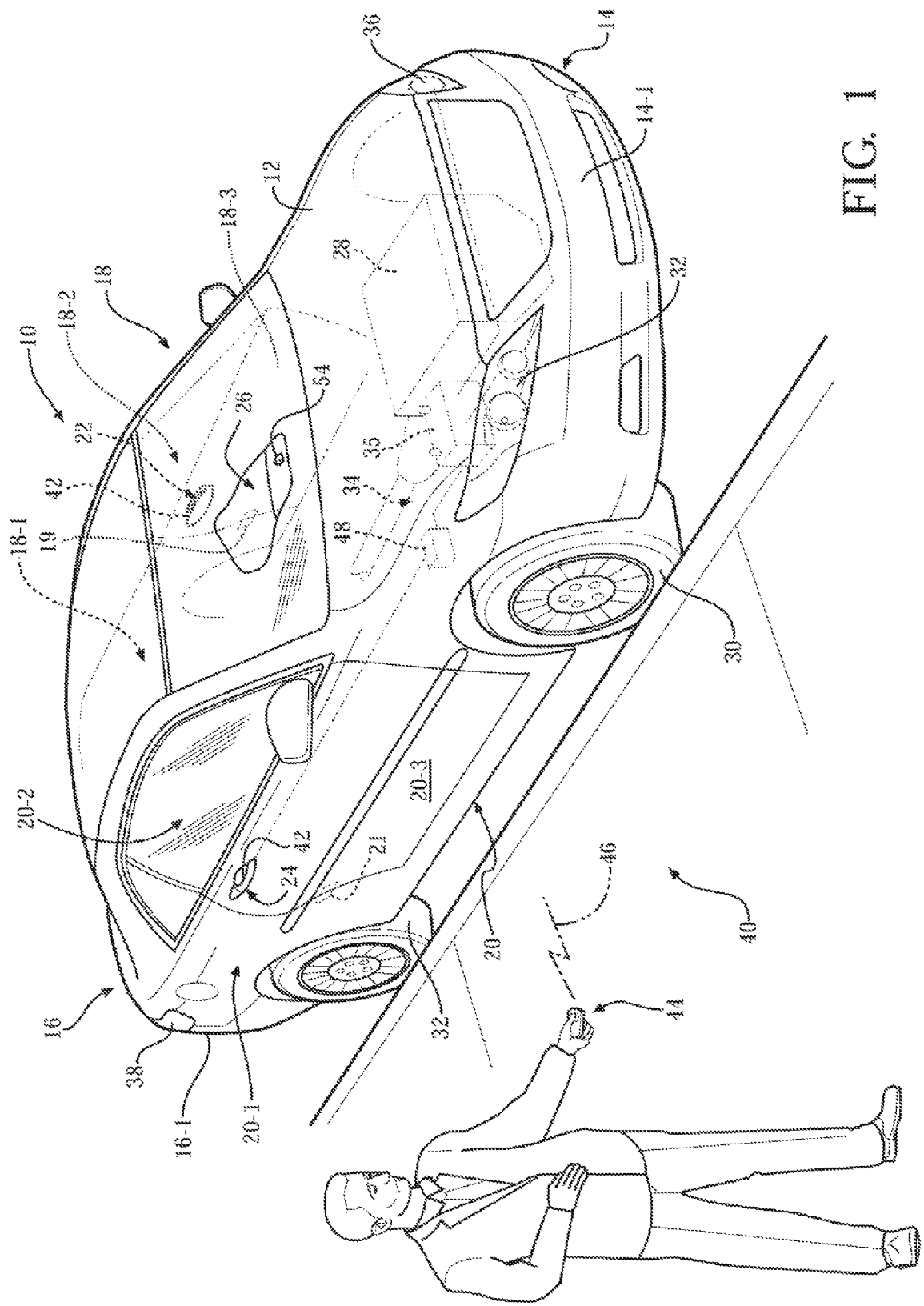
FIG. 1 is a schematic perspective illustration of a motor vehicle having a lighting system incorporated into a vehicle door handle according to the disclosure.

Referring to the drawings, wherein like reference numbers refer to like components, FIG. 1 shows a schematic view of a motor vehicle 10 which includes a vehicle body 12. The vehicle body 12 additionally includes exterior panels positioned at a front end 14, at a rear end 16, as well as at a left body side 18 and at a right body side 20. As shown in FIG. 1, the exterior panel 14-1 is positioned at the front end 14, the exterior panel 16-1 is positioned at the rear end 16, the exterior panel 18-1 is positioned at the left body side 18, and the exterior panel 20-1 is positioned at the right body side 20.

The exterior panel 18-1 defines at least one opening 18-2 and includes a left side door 18-3. A lock 19 operatively connects the door 18-3 to the exterior panel 18-1. The lock 19 can be either unlatched to thereby permit the door 18-3 to be opened in order to uncover the opening 18-2 for vehicle ingress or egress, or latched for maintaining closure of the opening 18-2. Similarly, the exterior panel 20-1 defines at least one opening 20-2 and includes a right side door 20-3. A lock 21 operatively connects the door 20-3 to the exterior panel 20-1. The lock 21 can be either unlatched to thereby permit the door 20-3 to be opened in order to uncover the opening 20-2 for vehicle ingress or egress, or latched for maintaining closure of the opening 20-2.

The lock 19 and the lock 21 may be mounted on the respective exterior panel 18-1 or 20-1, or directly on the respective door 18-3 or 20-3. Although one door is shown in FIG. 1 on each of the exterior panels 18-1 and 20-1, each exterior panel may include any number of doors, as needed. Additionally, although not shown, the exterior panel 16-1 may also define an opening, and may include a door configured for selectively opening and closing the subject opening. The door may include a respective lock for operatively connecting the door to the exterior panel. A control device 22 is positioned on the left side door 18-3, while a control device 24 is positioned on the right side door 20-3. Each of the control devices 22 and 24 is operatively connected to and configured to unlatch one respective lock 19 or 21. The control devices 22 and 24 may each be configured as a door pull handle or lever, a push button, or any other type of an actuation mechanism suitable for being operated by a person.

The vehicle 10 also includes an interior 26 configured to accommodate a vehicle operator and passenger(s). The vehicle 10 additionally includes a powertrain 28 configured to propel the vehicle via front wheels 30, rear wheels 32, or via all four wheels 30 and 32. Furthermore, the vehicle 10 includes an electric system 34 having an energy storage device 35, such as one or more batteries, configured to accept electric charge. The electric system 34 is configured to supply electric current to operate various vehicle systems, such as vehicle headlamps 36, tail lamps 38, a heating, ventilation, and air conditioning (HVAC) system, and a vehicle infotainment system (neither of which are shown, but known to those skilled in the art).

Figure 2:
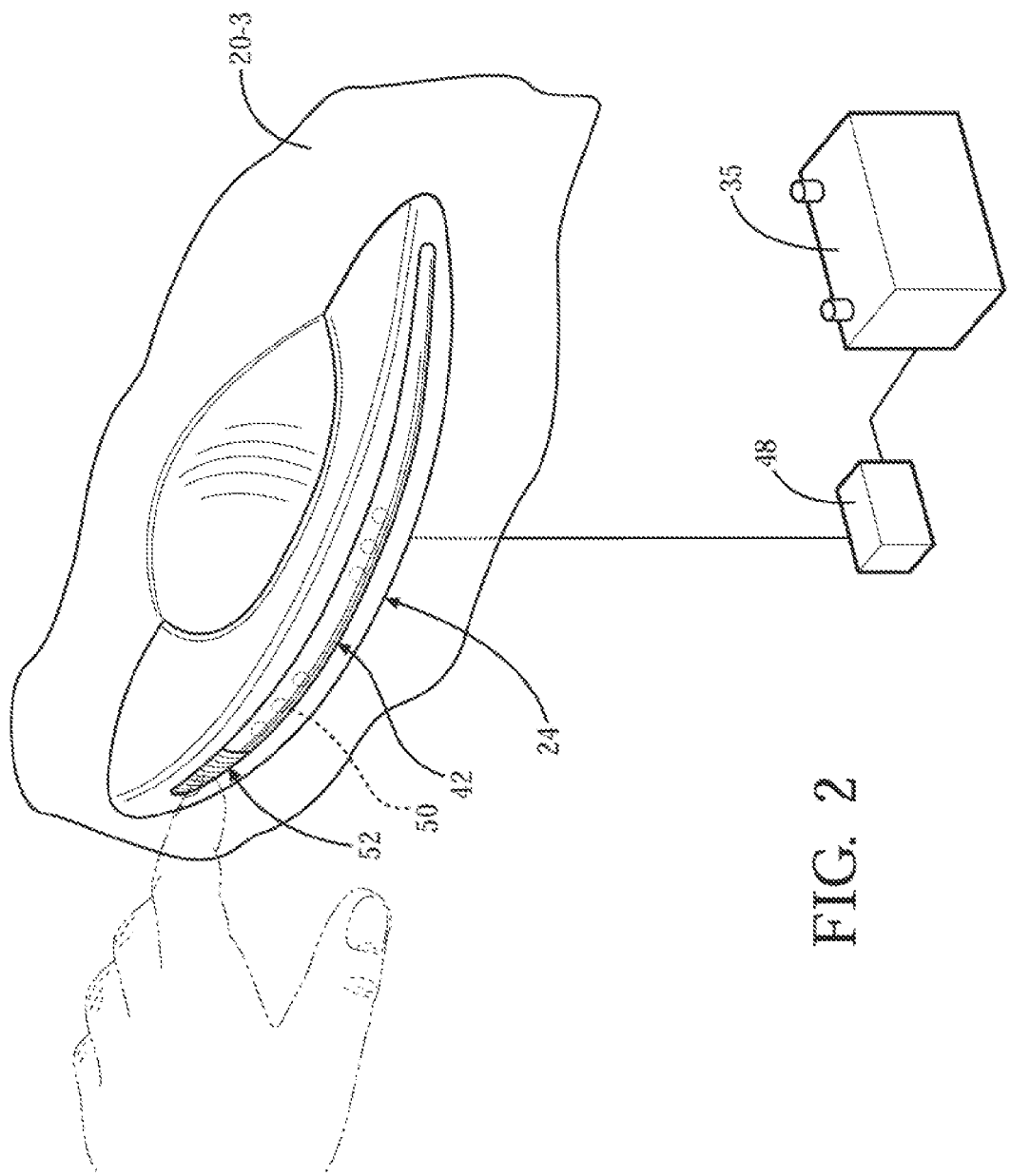
FIG. 2 is a schematic close-up view of the vehicle door handle shown in FIG. 1.

With continued reference to FIG. 1, the vehicle 10 also includes a lighting system 40. The lighting system 40 includes a light-emitting element 42. The light-emitting element 42 is arranged on or affixed to, such as incorporated or inset into, one or each of the control devices 22, 24. FIG. 2 shows a close-up view of the control device 22, 24 and an integrated light-emitting element 42. As shown in FIG. 1, the light-emitting element 42 is in electric communication with the electric system 34 for receiving electric current from the energy storage device 35. The light-emitting element 42 may be configured as a light string, wherein the light string includes a fiber optic component (not shown). The subject fiber optic component may be a flexible, transparent fiber made of a pure glass, or from an acrylic or urethane material.

A fiber optic component such as disclosed above typically functions as a waveguide or light pipe to transmit light between two ends of the fiber, wherein the fiber optic component may include a plurality of fibers wrapped in a bundle. Such a fiber optic component may be connected to and be in operative communication with at least one light-emitting diode (LED), not shown. The fiber optic component may be of the type that permits waves of light emitted by the LED to be directed into the fiber optic component and transmitted therethrough. Furthermore, the LED is a semiconductor light source that may be forward biased or activated to release energy and thus produce electroluminescence characterized by high brightness. As part of the above construction, the LED is electrically connected to the energy storage device 35, and is energized by the energy storage device to generate the aforementioned light.

The lighting system 40 also includes a portable transmitter 44 configured to emit or transmit a signal 46 configured to selectively activate and deactivate locks 19 and 21. The portable transmitter 44 is intended to be in possession of the vehicle operator when the operator exits the vehicle 10. Thus, the operator may employ the portable transmitter 44 to commence an unlatching sequence for the respective lock 19 or 21 from outside the vehicle 10. The portable transmitter 44 may be incorporated into a key fob and configured to transmit the signal 46 automatically. Additionally, the lighting system 40 includes a controller 48 operatively connected to the electric system 34 and configured or programmed to receive the signal 46. Accordingly, the signal 46 emitted by the portable transmitter 44 is configured to be used not only to lock and unlock the vehicle doors 18-3, 20-3, but also to authorize activation or starting of the powertrain 28. The controller 48 may be a programmable vehicle central processing unit (CPU) or a body controller and having an input, a processor, a transient memory and a readily accessible long-term non-transient memory, and an output.

The controller 48 is also configured to activate or turn on the light-emitting element 42 in response to the received signal 46 in order to display a visual lighting sequence 50 such as a code or a pattern that signifies the status of the respective lock 19, 21. The light generated by the light-emitting element 42 may have a selectively variable intensity or a plurality of brightness levels programmed into the controller 48 and regulated thereby. Additionally, the controller 48 may be programmed with a selectable tint for the light generated by the light-emitting element 42. Furthermore, the controller 48 may be programmed to automatically regulate the light-emitting element 42 to generate a light of varied intensity in response to occurrence of pre-programmed conditions, such as level of ambient lighting sensed via a specially configured sensor (not shown).

As shown, the control device 22, 24 may include a touch sensitive zone or region 52 configured to unlatch the lock 19, 21, when the region is physically contacted by the vehicle operator and while the operator is in possession of the portable transmitter 44. The physical contact of the region 52 triggers authentication of completion of the unlatching sequence via the controller 48. The controller 48 is also configured to deactivate the light-emitting element 42 after the unlatching sequence is completed. The controller 48 deactivates the light-emitting element 42 by progressively diminishing an intensity of the glow emitted by the light-emitting element by fading out the light-emitting element. The touch sensitive region 52 may be identified with a visual image, such as a vehicle badge or a crest of the vehicle's manufacturer.

The controller may be additionally programmed with a plurality of visual lighting sequences that may each be displayed on the light-emitting element 42 in response to the received signal. Accordingly, the visual lighting sequence 50 may be selected by the operator from the available plurality of visual lighting sequences thus programmed into the controller 48 that may subsequently be recognized by the operator as signifying the status of the lock 19, 21. The plurality of available visual lighting sequences may include an appearance of a dot of light or another symbol traversing the light-emitting element 42. The vehicle 10 may additionally include a sensor 54 configured to detect proximity of the portable transmitter 44 to the vehicle and communicate the detected proximity of the portable transmitter to the controller 48.

Furthermore, the controller 48 may be configured to commence the lock unlatching sequence in response to the proximity of the portable transmitter 44 being within a predetermined distance. The predetermined distance may be specified based on the light-emitting element 42 being within a visually effective and/or convenient range of the operator. The controller may be additionally programmed to maintain the light-emitting element 42 in active state during the lock unlatching sequence. Furthermore, the controller 48 may be configured to deactivate the light-emitting element 42 when the unlatching sequence has been completed.

Figure 3:
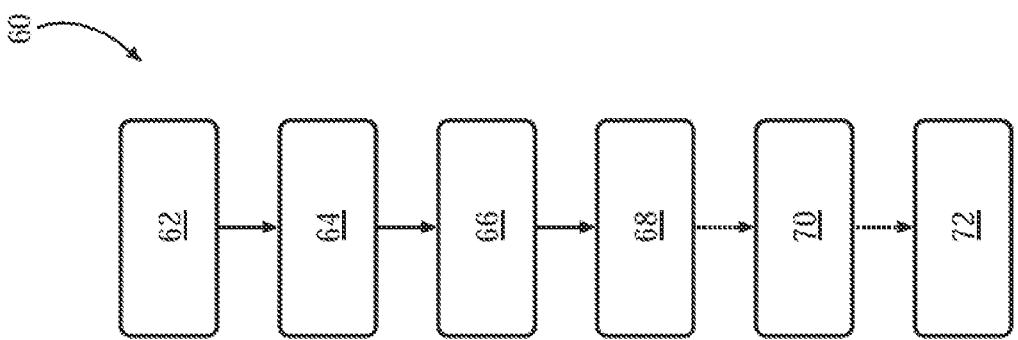
FIG. 3 is a flow chart illustrating a method of controlling lighting for the vehicle door shown in FIGS. 1 and 2.

FIG. 3 depicts a method 60 of controlling lighting for the door 18-3, 20-3 in the vehicle 10. The method launches in frame 62 with transmitting the signal 46 via the portable transmitter 44 to thereby commence the unlatching sequence of the lock 19, 21. As disclosed above with respect to FIGS. 1 and 2, the light-emitting element 42 may be maintained in an active state via the controller 48 during the lock unlatching sequence. Furthermore, the portable transmitter is intended to be in possession of the vehicle operator to transmit the signal 46 from a predetermined distance relative the vehicle 10. In frame 62, the method may include commencing the lock unlatching sequence via the controller 48 in response to the proximity of the portable transmitter 44 being within the predetermined distance. Following frame 62, the method proceeds to frame 64, where it includes receiving the signal via the controller 48.

After frame 64, the method advances to frame 66, where it includes activating via the controller 48 the light-emitting element 42 in response to the received signal 46. As described above with respect to FIGS. 1 and 2, the light-emitting element 42 is arranged on the control device 22, 24 that is positioned on the respective door 18-3, 20-3 and configured to unlatch the respective lock 19, 21. Following frame 66, the method proceeds to frame 68, where it includes displaying via the controller 48 the visual lighting sequence that signifies the status of the lock 19, 21 on the light-emitting element 42.

After frame 68, the method may proceed to frame 70, where it includes authentication of completion of the unlatching sequence via the controller 48 while the operator in possession of the portable transmitter 44 is physically contacting the region 52. Following frame 70, the method may additionally proceed to frame 72, where it includes deactivating via the controller 48 the light-emitting element 42 after the unlatching sequence is completed. In frame 72, the controller 48 may deactivate the light-emitting element 42 by progressively diminishing an intensity of the light emitted by the light-emitting element.

The detailed description and the drawings or figures are supportive and descriptive of the many aspects of the present disclosure. While certain aspects have been described in detail, various alternative aspects exist for practicing the invention as defined in the appended claims.

The invention claimed is:

1. A vehicle comprising:
a vehicle body defining an opening;
a door configured to selectively open and close the opening;
a lock that operatively connects the door to the body and includes a selectable status of one of unlatched and latched to thereby maintain closure of the opening;
a control device positioned on the door and configured to unlatch the lock;
a vehicle electric system; and
a lighting system including:
a light-emitting element configured as a light string having a fiber optic component, wherein the light emitting element is arranged on the control device and in electric communication with the electric system;
a portable transmitter configured to transmit a signal and thereby commence an unlatching sequence for the lock; and
a controller operatively connected to the electric system and configured to receive the signal and activate the light-emitting element in response to the received signal to display, using the light string, a visual lighting sequence that signifies the status of the lock, wherein the visual lighting sequence includes an appearance of a dot of light traversing the fiber optic component.

2. The vehicle of claim 1, wherein:
the control device includes a touch sensitive region configured to unlatch the lock when the region is physically contacted by an operator having possession of the transmitter; and
the physical contact of the region triggers authentication of completion of the unlatching sequence via the controller.

3. The vehicle of claim 2, wherein the controller deactivates the light-emitting element after the unlatching sequence is completed.

4. The vehicle of claim 3, wherein the controller deactivates the light-emitting element by progressively diminishing an intensity of the light emitted by the element.

5. The vehicle of claim 2, wherein the control device is a door handle operatively connected to the lock, and wherein the touch sensitive region is identified with a visual image.

6. The vehicle of claim 1, wherein the controller is programmed with a plurality of selectable visual lighting sequences for being displayed on the light-emitting element in response to the received signal to signify the status of the lock.

7. The vehicle of claim 1, further comprising a sensor configured to detect proximity of the transmitter to the vehicle and communicate the detected proximity to the controller, and wherein the controller is configured to commence the lock unlatching sequence in response to the proximity being within a predetermined distance.

8. The vehicle of claim 1, wherein the controller is configured to maintain the light-emitting element in active state during the lock unlatching sequence.

9. The vehicle of claim 1, wherein the portable transmitter is configured to transmit the signal automatically.

10. A method of controlling lighting for a door arranged to selectively open and close an opening in a body of a vehicle, the method comprising:
transmitting a signal via a portable transmitter to thereby commence an unlatching sequence for a lock, wherein the lock operatively connects the door to the body and includes a selectable status of one of unlatched and latched to thereby maintain closure of the opening;
receiving the signal via a controller operatively connected to an electric system of the vehicle;
activating, via the controller, a light-emitting element configured as a light string having a fiber optic component in response to the received signal, wherein the light-emitting element is arranged on a control device positioned on the door and configured to unlatch the lock; and
displaying, via the controller using the light string, a visual lighting sequence that signifies the status of the lock on the light-emitting element, wherein the visual lighting sequence includes an appearance of a dot of light traversing the fiber optic component.

11. The method of claim 10, wherein the control device includes a touch sensitive region configured to unlatch the lock when the region is physically contacted by an operator having possession of the transmitter, further comprising authentication of completion of the unlatching sequence via the controller when the region is physically contacted by the operator having possession of the transmitter.

12. The method of claim 11, further comprising deactivating, via the controller, the light-emitting element after the unlatching sequence is completed.

13. The method of claim 12, wherein deactivating the light-emitting element via the controller is accomplished via progressively diminishing an intensity of the light emitted by the element.

14. The method of claim 11, wherein the control device is a door handle operatively connected to the lock, and wherein the touch sensitive region is identified with a visual image.

15. The method of claim 10, wherein the controller is programmed with a plurality of selectable visual lighting sequences for being displayed on the light-emitting element in response to the received signal to signify the status of the lock.

16. The method of claim 10, wherein the vehicle includes a sensor configured to detect proximity of the transmitter to the vehicle and communicate the detected proximity to the controller, further comprising commencing the lock unlatching sequence via the controller in response to the proximity being within a predetermined distance.

17. The method of claim 10, further comprising maintaining the light-emitting element in an active state via the controller during the lock unlatching sequence.

18. The method of claim 10, further comprising transmitting the signal via the portable transmitter automatically.

* * * * *